United States Patent
Amling et al.

(10) Patent No.: US 7,212,227 B2
(45) Date of Patent: May 1, 2007

(54) PROGRAMMABLE AND RECONFIGURABLE CAMERA CONTROL UNIT FOR VIDEO SYSTEMS

(75) Inventors: Marc R. Amling, Santa Barbara, CA (US); David Chatenever, Santa Barbara, CA (US)

(73) Assignee: Karl Storz Imaging, Inc., Goleta, CA (US)

( * ) Notice: Subject to any disclaimer, the term of this patent is extended or adjusted under 35 U.S.C. 154(b) by 551 days.

(21) Appl. No.: 10/039,931

(22) Filed: Nov. 9, 2001

(65) Prior Publication Data

US 2004/0201743 A1    Oct. 14, 2004

(51) Int. Cl.
  *A61B 1/04* (2006.01)
  *H04N 5/225* (2006.01)
(52) U.S. Cl. .................................. 348/72; 348/207.1
(58) Field of Classification Search ............. 348/72–76, 348/207.99, 207.1, 211.4, 211.6, 211.9
See application file for complete search history.

(56) References Cited

U.S. PATENT DOCUMENTS

| | | | |
|---|---|---|---|
| 5,627,583 A * | 5/1997 | Nakamura et al. ............ 348/72 |
| 5,754,422 A | 5/1998 | Lowles et al. ................ 364/130 |
| 5,868,666 A * | 2/1999 | Okada et al. ................ 600/118 |
| 5,871,439 A * | 2/1999 | Takahashi et al. ........... 600/118 |
| 5,896,166 A | 4/1999 | D'Alfonso et al. |
| 6,215,517 B1 * | 4/2001 | Takahashi et al. ............ 348/72 |
| 6,249,311 B1 * | 6/2001 | Rouse et al. ................. 348/164 |
| 6,295,082 B1 * | 9/2001 | Dowdy et al. ................ 348/72 |
| 6,313,868 B1 | 11/2001 | D'Alfonso et al. |
| 6,360,362 B1 * | 3/2002 | Fichtner et al. ............. 717/168 |
| 6,638,212 B1 * | 10/2003 | Oshima ...................... 600/109 |
| 6,707,490 B1 * | 3/2004 | Kido et al. ............. 348/211.14 |
| 6,710,799 B2 * | 3/2004 | Abnet et al. ................ 348/135 |
| 2002/0095501 A1 * | 7/2002 | Chiloyan et al. ........... 709/227 |

FOREIGN PATENT DOCUMENTS

| JP | 2000175089 | 6/2000 |
|---|---|---|
| JP | 2001099627 | 4/2001 |

OTHER PUBLICATIONS

Definition of "software", The IEEE Standard Dictionary of Electrical and Electronics Terms, Sixth Edition, 1996, p. 1006.*
European Search Report; Jan. 20, 2006; 3 pages.

* cited by examiner

*Primary Examiner*—Vivek Srivastava
*Assistant Examiner*—Timothy J. Henn
(74) *Attorney, Agent, or Firm*—St. Onge Steward Johnston & Reens LLC

(57) ABSTRACT

A video imaging system is provided including, a camera head for transmitting image data to a camera control unit, a camera control unit for receiving and processing the image data into a usable format, and a storage device accessible by the camera control unit. The retrieved program executes on the camera control unit for enabling the camera control unit to process image data.

24 Claims, 3 Drawing Sheets

PROGRAMMABLE AND RECONFIGURABLE CAMERA CONTROL UNIT FOR VIDEO SYSTEMS

FIELD OF THE INVENTION

The invention relates to a camera control unit for processing video signals from many different types of video cameras and, more particularly, the invention relates to programming and reconfiguring the camera control unit.

BACKGROUND OF THE INVENTION

Cameras and Camera Control Units ("CCUs") are generally used together to acquire and process images. A camera and CCU may be housed as a single unit or may be separate from one another, being connected, for example, by a cable or wireless connection. A camera may be remotely held away from a CCU in situations where space is limited or mobility is desired, such as during endoscopic surgery. Cameras used during endoscopic surgery are typically referred to as heads or camera heads, which house single or multiple imaging devices, such as charge coupled devices and the like, for image acquisition. Typically, acquired, or picked up, image data is sent by the camera head to the CCU. Upon receiving the image data from the camera head, the CCU processes the signal to display the acquired image on a viewing device, which is generally used by a medical professional and/or for storage on various media (video cassette recorder, floppy disk, hard drives, compact disks, digital video disks, and the like) and/or for transmission to remote locations in various manners, such as by the Intranet, Internet, radio transmission, and the like.

Additionally, the CCU typically sends commands to the camera head to adjust various settings (i.e. color balance, electronic shutter for light sensitivity, and other optical and electronic characteristics).

Traditionally, CCUs are compatible with a limited number of camera heads. A CCU's hardware is difficult to configure for proper communication with varying types of camera heads. Typically, camera heads use various types of imaging devices that can differ in pixel resolution, timing requirements (i.e. PAL, NTSC, Progressive, and other formats), signal output type (i.e. analog or digital), physical size, and in other characteristics. Furthermore, there may be variability from device to device of the same type, which could affect camera head performance. Additionally, commands sent from the CCU to the camera head are generally unique depending upon the camera head type being used. Moreover, as repairs, modifications, or improvements are made to camera heads, the CCU, which was originally designed to be compatible with the older camera head, may become incompatible and require upgrading as well.

This overall variability in camera heads, either caused by imaging device technologies or by CCU command characteristics, often results in a CCU being specifically designed to be compatible with each camera head type utilized.

Moreover, CCUs are typically designed for use with camera head technologies currently in existence, and not designed to anticipate and accommodate camera heads yet to be developed. Hence, CCUs are typically not designed to be compatible with future camera head technologies; particularly, image device and image signal transmission technologies. These differences between older and newer camera heads also contribute to compatibility problems.

Because CCUs are usually compatible with limited quantities of camera heads, CCUs are typically discarded in favor of ones that were designed concurrently and/or to be compatible with particular camera head technologies. Consequently, CCUs have become an added expense often associated with changing imaging devices or camera heads. Further, it is typically desired for camera heads to be improved due to the demand from consumers to have the latest technology and advancement in equipment. Moreover, CCUs used in medical and veterinary fields are increasingly being mounted permanently in equipment bays or carts and/or permanently mounted within the walls of surgical operating rooms themselves. The expense associated with replacing CCUs to maintain compatibility with camera heads is subsequently passed onto consumers.

U.S. Pat. No. 5,896,166 to D'Alfonso et al. ("D'Alfonso") relates to a video camera system for reading operating parameter information from a memory device located on the camera head and using the information to adjust the camera control unit so that signals sent from the control unit to the camera head provide optimum operating conditions for the imager. The invention conditions the camera control unit to receive future image signals of a particularly type or protocol. This advantageously permits interchangeable camera heads to be used with camera control units.

However, the operating information for permitting such interchangeability is stored on the memory device, which is located on the camera head. Further, the information is not transferred to, and stored on, the control unit to overwrite an overwritable or configurable portion of the control unit. This disadvantageously results in a need to transfer operating information back and forth from the camera head to the control unit. In addition to the image data and signals being transmitted back and forth from the camera head to the control unit, where image data typically consumes large amounts of memory, the transfer of operating information further undesirably slows the overall operation of the video camera system. Additionally, D'Alfonso does not disclose a configurable or programmable hardware device to which an application may be written or for overwriting an existing application. Instead, D'Alfonso requires reading information from a memory device, which is located apart from the control unit.

Therefore, what is desired is to provide a CCU that is capable of maintaining compatibility with camera heads utilizing various technologies. What is also desired is to provide a CCU having a configurable hardware component, thereby resulting in a CCU capable of maintaining performance compatibility with various camera heads utilizing various technologies.

SUMMARY OF THE INVENTION

Accordingly, it is an object of the invention to provide a video imaging system utilizing a reconfigurable CCU that is capable of maintaining compatibility with camera heads utilizing various technologies. It is also an object of the invention to provide reconfigurable hardware for the video imaging system CCU.

These and other objects of the invention are achieved by providing a video imaging system comprising: a camera head for transmitting image data to a CCU, a CCU for receiving and processing the image data into a usable format, and software executing on the CCU for enabling the appropriate processing of the transmitted image data.

The video imaging system also includes a single, or multiple, reconfigurable hardware devices (such as field programmable gate arrays, digital signal processors, computer programmable logic devices, and the like) for configuring the CCU using a program and/or data retrieved from a storage device or devices. More specifically, the retrieved program configures the reconfigureable hardware device(s) to enable the CCU to be compatible with the camera head in which the CCU is in communication.

In another embodiment, the system further includes a configurable hardware device and a processor located on the CCU for executing the device program, whereby the device program runs on the processor and configures the configurable hardware device for enabling the CCU to process image data. The system may further include a processor program executing on the CCU for overwriting a pre-existing program on the CCU.

The retrieved program further enables the CCU to issue commands to the camera head in order to regulate the cameras head's optical and/or electrical characteristics, such as, but not limited to, focal length, resolution, color balance, light sensitivity, and the like. In return, the camera head sends confirmation to the CCU that the commands were received, and has, or will, adjust camera head characteristics in response to the given commands.

In another embodiment, the system includes a camera for transmitting image data, a CCU for receiving and processing the image data, a storage device accessible by the CCU, software for determining when the camera is in communication with the CCU, software for receiving a program stored on the storage device, the program executing on the CCU for programming a configurable portion of the CCU, and the program executing on the CCU for enabling the CCU to process the image data.

The system may further include a field programmable gate array ("FPGA"), wherein the program configures the FPGA to enable the CCU to process image data. Moreover, the system includes a camera that, when receiving commands from the CCU, sends confirmation signals back to the CCU that the commands were received. The system may further include a second storage device for storing processed image data.

In another embodiment, the system further includes a configurable hardware device and a processor located on the CCU for executing the program, whereby the program runs on the processor and configures the configurable hardware device for enabling the CCU to process image data. The system may further include a program executing on the CCU for overwriting a pre-existing program on the CCU.

In another aspect, the invention includes a method for video imaging including the steps of providing a camera and CCU, determining when the camera and CCU are in communication with each other, retrieving a program for enabling compatibility between the CCU and camera, executing the program on the CCU, and programming the CCU to enable the CCU to process image data transmitted from the camera.

Further objectives and advantages of the invention will become apparent from a consideration of the drawings and ensuing description.

DETAILED DESCRIPTION OF THE DRAWINGS

Figure 1:
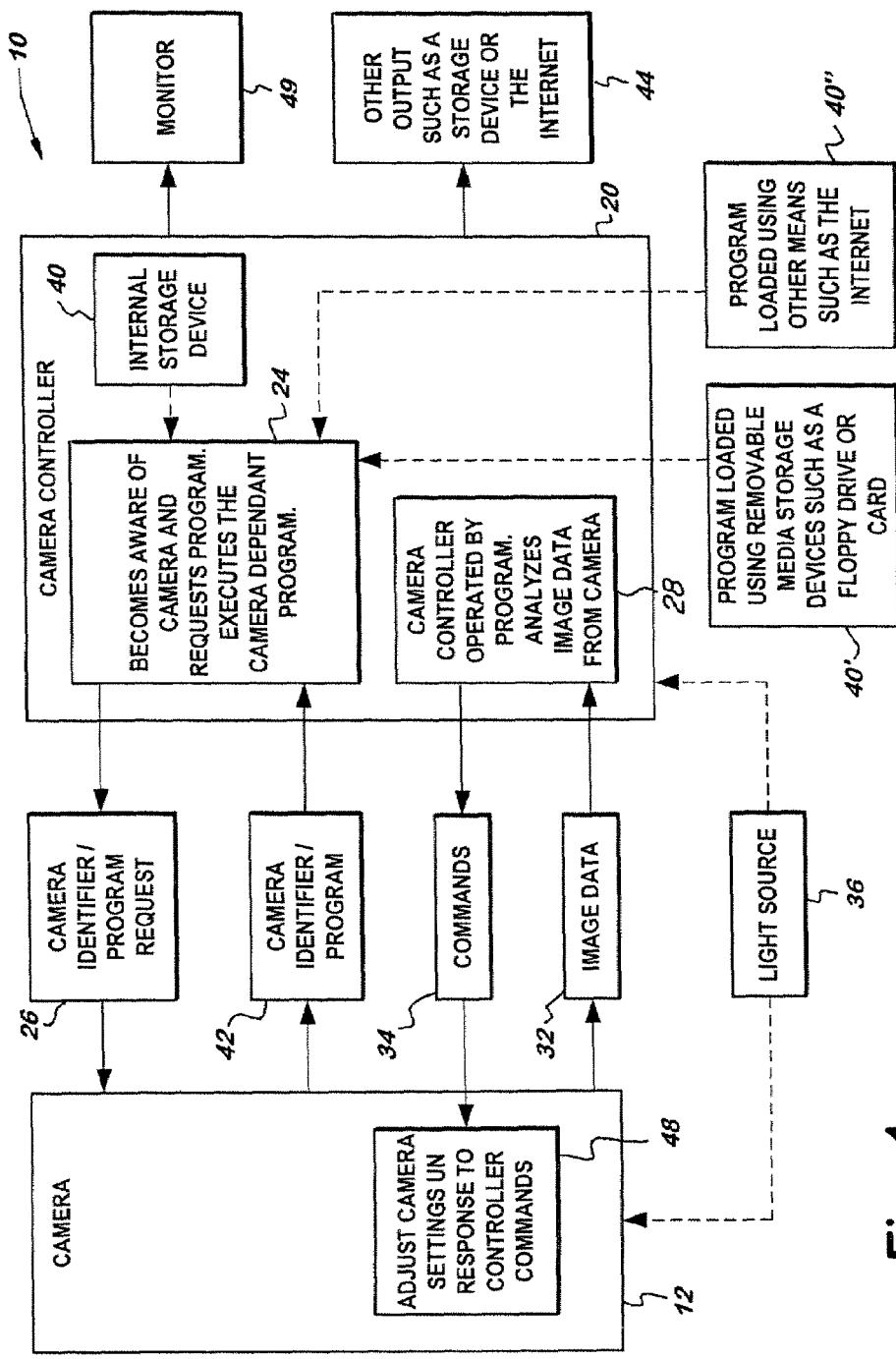
FIG. 1 depicts the system in accordance with the invention.

FIG. 1 depicts system 10 for video imaging, comprising a camera head 12 for transmitting image data, and camera control unit ("CCU") 20 for receiving and processing image data. System 10 further includes at least one storage device 40 for storing a program.

Camera head 12 acquires image data 32 and transmits it to CCU 20 to process a usable image 28. Camera head 12 may include one or more imaging devices, utilizing a variety of technology types. Camera head 12 may further include known or novel imaging device types. Camera head 12 is interchangeable, or used together, with an endoscope or other medical instruments for transmitting image data.

CCU 20 is the main controller of the video system. It transmits commands 34 to camera head 12 to adjust various settings and desired image data 48. CCU 20 then receives and processes 28 the image data 32 transmitted from camera head 12 into a usable format for viewing, which includes viewing on a display 49.

Storage device 40 includes any medium for storing applications and/or programs. Storage device 40 may be located internally or externally of CCU 20 and/or camera head 12. In addition, storage device 40 may further be a removable storage medium or a remote location, such as the Intranet or Internet.

Once CCU 20 and camera head 12 are in communication, CCU 20 makes requests and /or receives 24 program 42, which is, in some embodiments, stored on storage device 40.

Once the program has been transmitted, CCU 20 executes the program that in turn modifies, or configures, CCU 20. In programming, or modifying/configuring, CCU 20, the program may overwrite an existing application contained in CCU 20. The existing application may have been used for compatibility purposes between CCU 20 and a pre-existing camera head (that is a camera head previously in communication with CCU 20). Because the pre-existing camera head has been replaced with camera head 12, the program may overwrite the existing application so that camera head 12 may be compatible with CCU 20. Once modified, or programmed and/or reconfigured, CCU 20 receives and processes 28 image data 32 transmitted by camera head 12. Hence, CCU 20 may thereafter issue commands 34 to camera head 12 to adjust 48 its operating characteristics, and camera head 12 may send confirmation to CCU 20 that such commands were received and/or that camera head 12 will comply.

Figure 2:
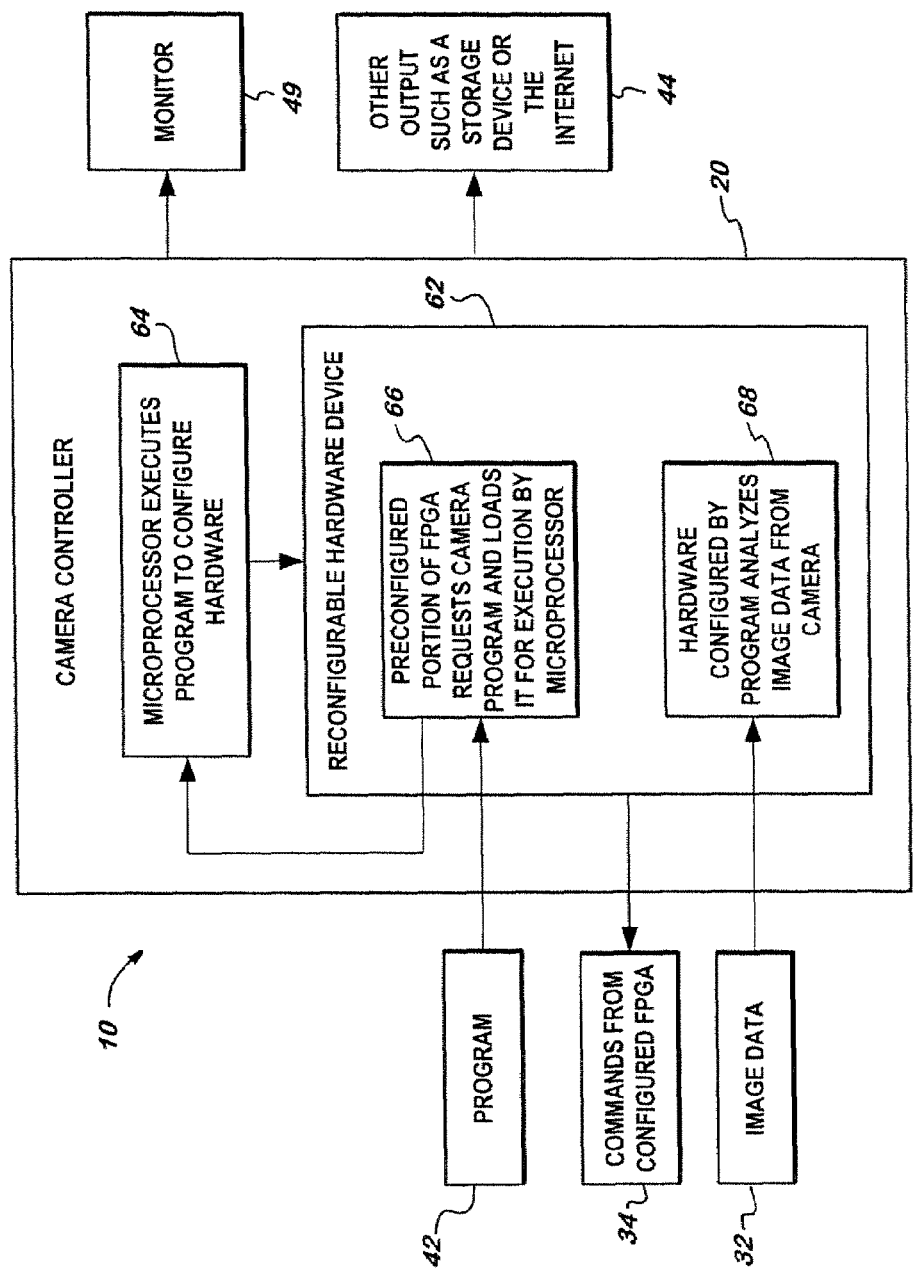
FIG. 2 depicts a detailed view of the camera control unit.

FIG. 2 more specifically depicts video system 10, comprising CCU 20, configurable hardware device 62, and microprocessor 64.

Configurable hardware device 62 operates as the hardware of CCU 20 for retrieving 66 the program and permitting the program to program or configure 68 configurable hardware device 62, including overwriting configurable hardware device 62. Upon becoming aware of a communication between CCU 20 and camera head 12, configurable hardware device 62 may request program 42.

Once the program has been received by configurable hardware device 62, microprocessor 64 executes the program, which may be an executable or compressed file. Execution includes opening, compiling, and/or running the program, whereby the program is launched and performs the functions/operations for which the program was written.

Concurrent with or after execution of the program, microprocessor 64 may replace or overwrite an existing program contained in configurable hardware device 62.

Once configurable hardware device 62 is programmed or configured 68, CCU 20 is desirably compatible with camera head 12. Hence, CCU 20 may issue commands 34 to camera head 12 and process 28 image data 32 transmitted from camera head 12. CCU 20 may further send processed image data to a usable medium, which includes display 49.

Figure 3:
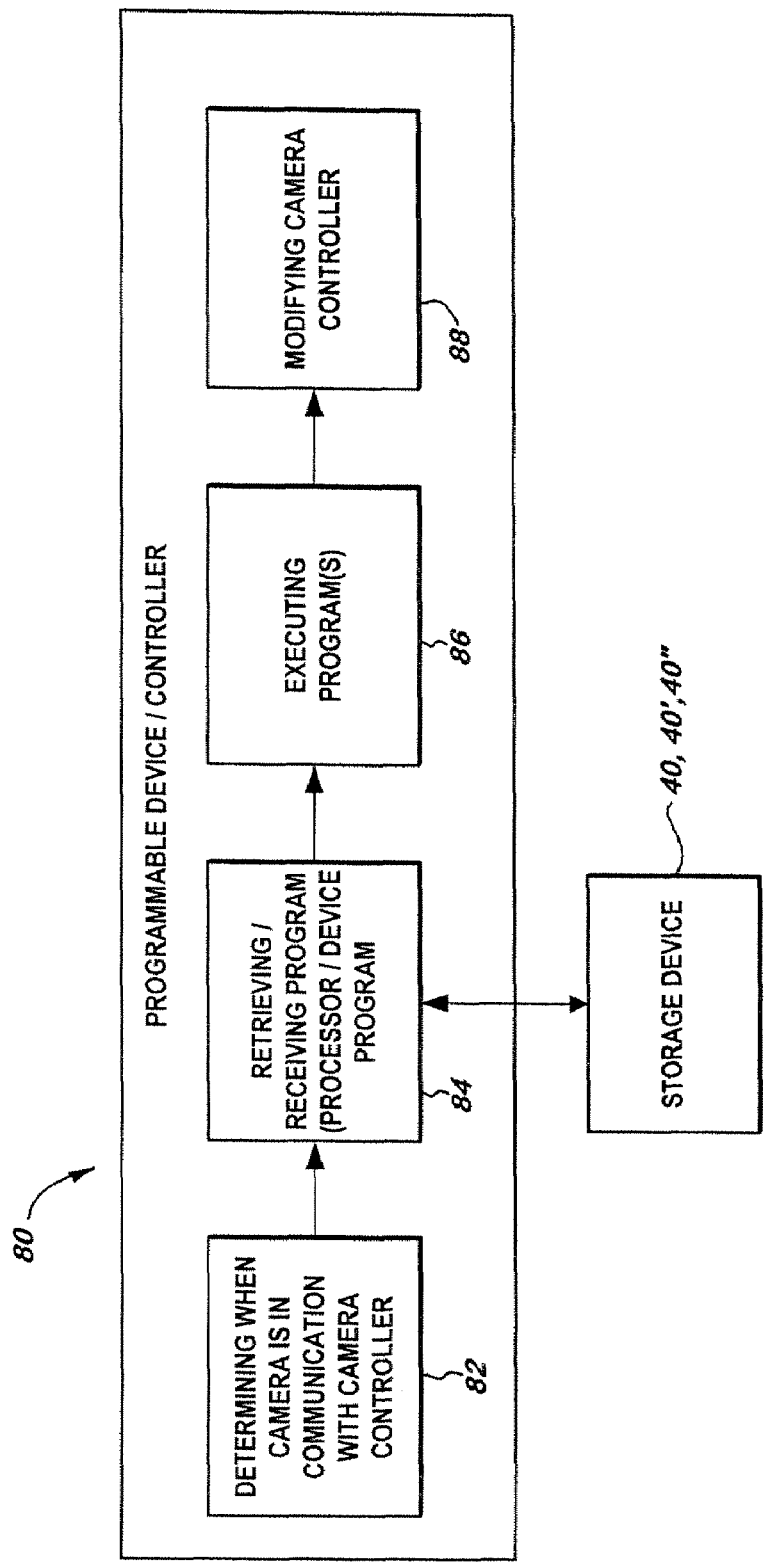
FIG. 3 depicts a block diagram of a method for video imaging.

FIG. 3 depicts a block diagram of a method 80 for video imaging comprising the steps of determining 82 when camera 12 is in communication with control unit 20, retrieving 84 program 42 from storage device 40, executing 86 program 42, and programming 88 control unit 20 to enable control unit 20 to be compatible with camera 12.

An electronic system determines 82 when control unit 20 and camera 12 are in communication with each other. The electronic system may determine 82 the communication through any number of ways including a mechanical switch, RF, optical, electrical, or magnetic coupling, signal, or the like.

Upon determining 82 communication between camera 12 and control unit 20, control unit 20 retrieves/receives 84 program 42 from storage device 40, which includes any medium for storing applications and/or program 42.

After program 42 has been retrieved/received 84, control unit 20 executes 86 program 42. Executing 86 program 42 includes opening, compiling, and/or running program 42, whereby program 42 is launched and performs the functions/operations for which program 42 was written.

Concurrent with or after executing 86 program 42, method includes programming or configuring 88 control unit 20 to enable control unit 20 to process image data 32 transmitted from camera 12. Programming or configuring 88 control unit 20 may include reprogramming/overwriting an existing application on control unit 20.

Once programmed, control unit 20 may thereafter issue commands to camera 12 and process image data 32 transmitted from camera 12. Control unit 20 may further send the processed image data to a displayable medium, such as a monitor, or to a second storage device, such as recording device 44 or an Internet location.

Although the invention has been described with reference to a particular arrangement of parts and/or features, many other modifications and variations will be ascertainable to those of skill in the art.

What is claimed is:

1. A video imaging system, comprising:
    a camera for generating image data, said camera including:
        a storage device positioned on said camera; and
        a processor program;
        a device program stored on said storage device;
    a camera control unit coupled to said camera and receiving said image data, said camera control unit including:
        a processor; and
        at least one configurable hardware device;
    said processor receiving said processor program for overwriting a pre-existing program on said processor;
    said processor receiving said device program for programming of said at least one configurable hardware device;
    said configurable hardware device processing said image data received from said camera.

2. The video imaging system according to claim 1 wherein said at least one configurable hardware device is selected from the group consisting of: field programmable gate arrays, and computer programmable logic devices; and said processor is selected from the group consisting of digital signal processors, microprocessors and microcontrollers.

3. The system according to claim 1 further comprising software executing on said camera control unit for determining when said camera is in communication with said camera control unit.

4. The video imaging system according to claim 1 further comprising a pre-existing device program located on said configurable hardware device for processing the image data.

5. The video imaging system according to claim 4 wherein said device program executing on said processor overwrites said pre-existing device program.

6. The video imaging system according to claim 1 further comprising a pre-existing processor program located on said processor for controlling the configurable hardware device.

7. The video imaging system according to claim 6 wherein said processor program executing on said processor overwrites said pre-existing processor program.

8. The video imaging system according to claim 1 wherein said device program enables said camera control unit to issue a command to said camera to adjust and operating characteristic of the camera.

9. The video imaging system according to claim 8 wherein said camera sends confirmation to said camera control unit that the command was received.

10. The video imaging system according to claim 1 further including a second storage device and image data is stored on said second storage device.

11. The video imaging system according to claim 10 wherein the image data stored on said second storage device is processed image data.

12. The video imaging system according to claim 1 wherein said at least one configurable hardware device and said processor are physically separate devices.

13. A method for processing image data comprising the steps of:
    coupling a camera to a camera control unit;
    detecting the connection of the camera to the camera control unit;
    accessing a processor program;
    receiving the processor program with a processor;
    overwriting a pre-existing program on the processor with the processor program;
    accessing a device program;
    receiving the device program with the processor;
    programming a configurable hardware device based on the device program; and
    processing image data generated by the camera and transmitted to the camera control unit.

14. The method according to claim 13 wherein the step of configuring the configurable hardware device further includes overwriting a pre-existing device program on the configurable hardware device.

15. The method according to claim 13 wherein the step of programming the processor further includes overwriting a pre-existing processor program on the processor.

16. The method according to claim 13 further comprising the step of issuing a command to the camera from the camera control unit for adjusting an operating characteristic of the camera.

17. The method according to claim 16 further comprising the step of sending a confirmation to the camera control unit that the command was received by the camera.

18. The method according to claim 13 further comprising the step of storing the image data on a second storage device.

19. The method according to claim 18 wherein the image data stored on said second storage device is processed image data.

20. A video imaging system, comprising:
- a camera generating image data and having a storage device positioned thereon;
- a camera control unit coupled to said camera and receiving the image data, said camera control unit having a processor and at least one configurable hardware device;
- said processor receiving a processor program for overwriting a pre-existing program on said processor;
- said processor receiving a device program for programming of said at least one configurable hardware device;
- said configurable hardware device processing said image data received from said camera.

21. The video imaging system according to claim 20 wherein said device program is stored on said storage device.

22. The video imaging system according to claim 20 wherein said device program configures said at least one configurable hardware device to interface with said camera for timing and control of said camera.

23. The video imaging system according to claim 20 wherein a plurality of cameras, each having differing camera characteristics, are attachable to said camera control unit such that said camera control unit is configured for and interfaces with the specific attached camera.

24. The video imaging system according to claim 20 wherein said at least one configurable hardware device and said processor are physically separate devices.

* * * * *